United States Patent [19]

Steiger

[11] 4,052,963

[45] Oct. 11, 1977

[54] INTERNAL COMBUSTION ENGINE FOR COMBUSTION OF POWDERED SOLID FUEL

[75] Inventor: Anton Steiger, Illnau, Switzerland

[73] Assignee: Sulzer Brothers Limited, Winterthur, Switzerland

[21] Appl. No.: 718,515

[22] Filed: Aug. 30, 1976

[30] Foreign Application Priority Data

Mar. 5, 1976 Switzerland .................. 2751/76

[51] Int. Cl.² .............. F02B 45/02; F02D 19/04
[52] U.S. Cl. .................................................. 123/23
[58] Field of Search .............. 123/23, 24, 136; 60/39.46 S

[56] References Cited

U.S. PATENT DOCUMENTS 1,216,403  2/1917  Bertsch .................. 123/23

FOREIGN PATENT DOCUMENTS

| 580,173 | 7/1933 | Germany | 123/23 |
| 509,507 | 10/1930 | Germany | 123/23 |
| 547,256 | 8/1942 | United Kingdom | 123/23 |
| 514,229 | 2/1939 | United Kingdom | 123/23 |
| 382,938 | 11/1932 | United Kingdom | 123/23 |

Primary Examiner—Carroll B. Dority, Jr.
Assistant Examiner—Craig R. Feinberg
Attorney, Agent, or Firm—Kenyon & Kenyon, Reilly, Carr & Chapin

[57] ABSTRACT

Particulate solid fuel, e.g. powdered coal, is delivered into a first duct of the housing inserted into the cylinder, and thereafter moved into a second duct via a control slider. A plunger in the second duct is controlled hydraulically to move the delivered fuel through the discharge openings of a rotating ejector body when the body is in an open position in the combustion chamber.

17 Claims, 9 Drawing Figures

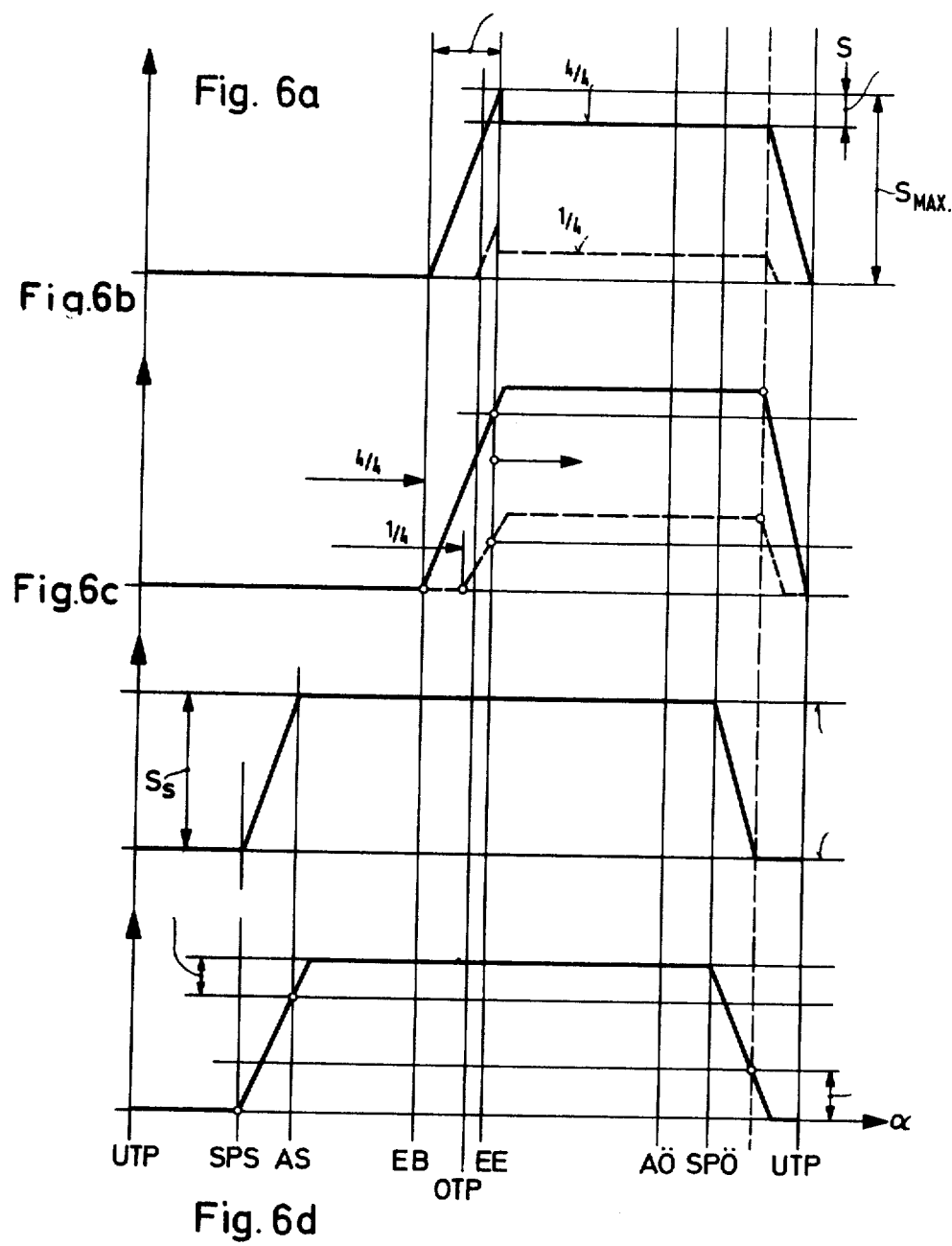

INTERNAL COMBUSTION ENGINE FOR COMBUSTION OF POWDERED SOLID FUEL

This invention relates to an internal combustion engine for combustion of powdered solid fuel.

Heretofore, it has been known to deliver a fuel suspension formed from powdered coal and air, for example, via two coaxially arranged valves, to an antechamber of a combustion chamber of an internal combustion engine in which the mixture is ignited and burned with the aid of oil. However, it is usually not advantageous to suspend the powdered coal in air for feeding to the combustion chamber as a uniform distribution of the powder during flow from the place where the suspension is formed to the antechamber cannot be assured. Therefore, since an apportioning of a defined quantity of powdered coal cannot be obtained during operation, the engine is usually charged to a different degree and, thus, has a different power output for each operating cycle. Further, the use of valves, which may be preferred under some conditions, is also disadvantageous in these engines. This is due to the fact that tight closing of the valve seating surfaces is not attainable over extened periods of time. This is because dust particles unavoidably settle on the seating surfaces of the valves and create a material build-up. Still further, special devices and added energy must be provided in order to form the suspension and then bring the suspension up to the compression pressure. This increases the costs of the installation and the operation substantially.

Accordingly, it is an object of the invention to improve an internal-combustion engine of the above type in such a manner that, with little extra cost for equipment and operation, the power delivered per working cycle becomes more uniform.

Briefly, the invention provides an internal combustion engine having at least one cylinder defining a combustion chamber and a reciprocating piston slidably mounted in the cylinder with a means for feeding finely divided, i.e. powdered, solid fuel, such as powdered coal, to the cylinder, a rotatable ejection means disposed in the combustion chamber and a plunger for pushing the fuel cyclically to the ejection means for ejection into the combustion chamber. The fuel feeding means includes a pressurized storage chamber for a supply of fuel and a duct which is connected to the storage chamber to receive a flow of fuel from the storage chamber. In addition, a second duct is disposed in selective communication with the duct of the fuel feeding means to receive fuel and extends to the combustion chamber. The plunger is mounted in this duct at an end opposite the ejection means. Also, a control slider is disposed at the end of the duct of the fuel feeding means spaced from the storage chamber for opening and closing of the duct.

This engine operates such that the powdered fuel is fed to the ejection means as a uniform stream, i.e. no suspension is formed and transported to the cylinder. Thus, a considerably more uniform amount of fuel is fed to the cylinder per working cycle, so that power variations as large as in the known machines no longer occur.

Further, the engine uses a control slider which is free of seating surfaces prone to material buildup. Also, the engine requires no devices for forming a suspension so that the cost is less than the known engine.

Still further, because the fuel passes directly into the combustion chamber of the cylinder via the ejection means there is no need for a component corresponding to the antechamber of the known engine. This also reduces the equipment cost and the thermal problems of a cylinder cover connected with an antechamber. In addition, a good macro distribution of the finely divided fuel is achieved in the combustion chamber of the cylinder.

These and other objects and advantages of the invention will become more apparent from the following detailed description and appended claims taken in conjunction with the accompanying drawings in which:

FIGS. 6a to 6d illustrate various control diagrams for the engine according to the invention.

Figure 1:
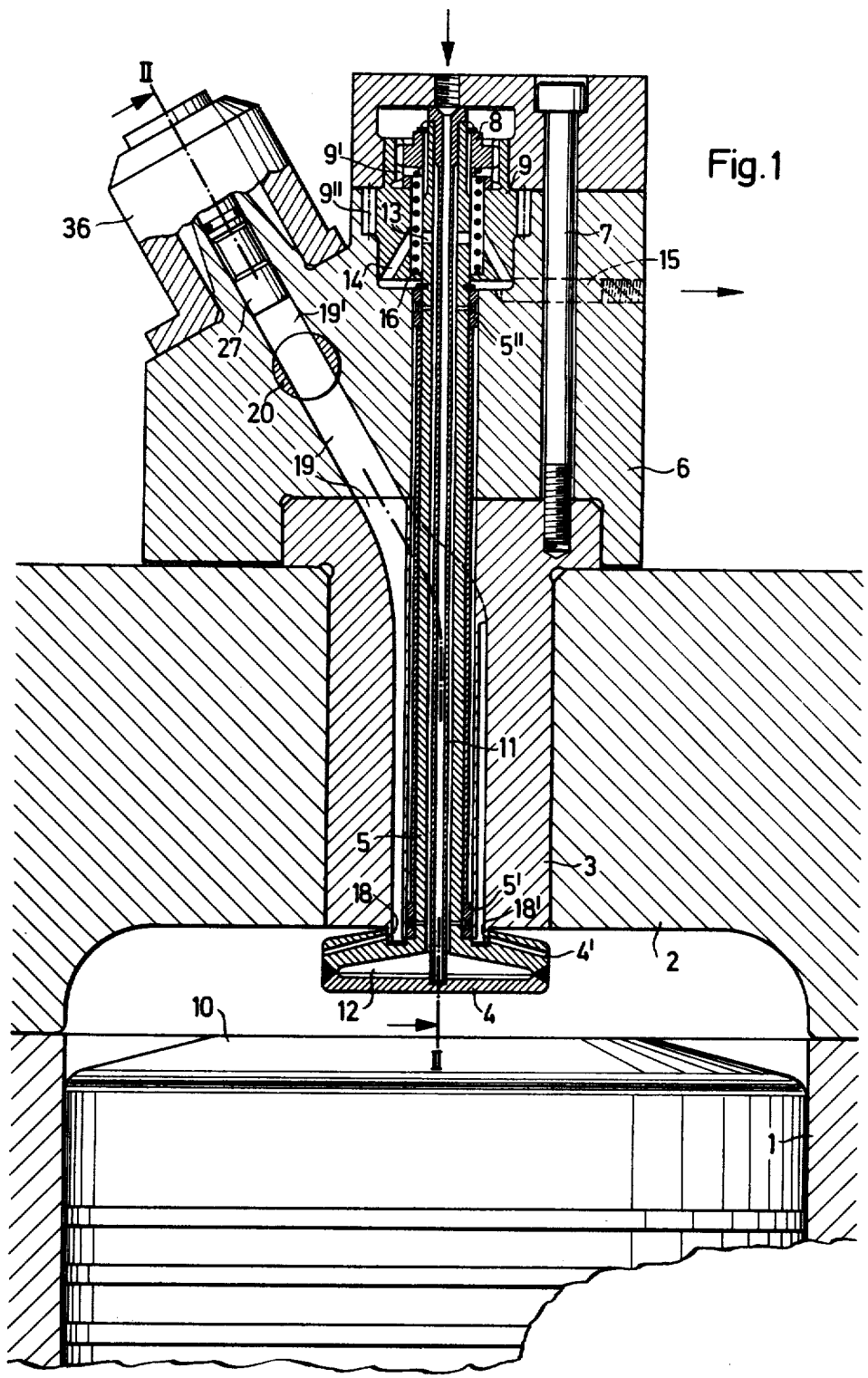
FIG. 1 illustrates an axial cross-sectional view of a cylinder head of an internal-combustion engine according to the invention.

Referring to FIG. 1, the internal combustion engine has at least one cylinder 1 on which is mounted a cylinder head 2 to define a combustion chamber. In addition, a reciprocating piston 10 is slidably mounted in the cylinder 1.

A housing is mounted on the cylinder head 2 and is composed of an insert 3 fitted into a bore of the cylinder head 2 and a main portion 6 secured as by bolts 7 to the insert 3. A rotatable ejection means is disposed in the combustion chamber and is composed of a hollow body 4 having discharge openings 4' for the discharge of fuel into the combustion chamber and an elongated hollow shaft 5 connected to the body 4. The shaft 5 extends upwardly as viewed through the housing 3, 6 and is journalled in bearings 5', 5" (shown spaced apart by a spacer tube or sleeve) mounted in a fixed sleeve in the insert 3 and in the main portion 6, respectively. A means for rotating the shaft 5 includes a gear 8 on the upper end of the shaft 5 which meshes with internal teeth 9' of a gear 9, the internal teeth 9' being wider than the teeth of the gear 8. The gear 9 which is rotatably supported in the main housing portion 6 has external teeth 9" and forms a hydraulic motor together with a counter gear (not shown). By varying the amount of a hydraulic pressure medium fed to this motor, preferably Diesel oil, the speed of the hollow body 4 can be matched exactly to the respective operating conditions. That is, the throw range of the powdered-coal particles in the combustion chamber between the cylinder 1 and the piston 10 can be optimally tuned to the operation.

The gear 8 is fixedly mounted on the shaft 5 and is biased by a compression spring 16 which is disposed inside the gear 9 in an outward direction. As shown, a lock washer is fitted in a groove of the shaft 5 to hold the gear 8 on the shaft 5 against the force of the spring 16. The hollow body 4 together with the shaft 5 and the gear 8 is therefore axially movable if the spring 16 is compressed so as to be brought from the position shown in FIG. 1 into the position shown in FIG. 2. This ejection means is used to uniformly distribute a charge of fuel into the combustion chamber during rotation.

A suitable means for cooling the ejection means is also provided. This cooling means includes a tube 11 which is fitted into the hollow shaft 5 in spaced relation so as to define a coolant feed duct and a coolant discharge duct in the shaft 5. The tube 11 opens at the upper end as shown to communicate with a tapped bore which receives a coolant supply line (not shown) while the lower end opens into a cavity 12 of the body 4. During use, coolant is fed from a coolant tank (not shown) through the tube 11 to cool the ejector body 4. Subsequently, the coolant flows through the discharge duct between the shaft 5 and the tube 11 upward through the shaft 5 and then leaves the shaft 5 via radial holes 13 in the shaft 5, which are located in the vicinity of the gear 9. The coolant then returns to the coolant tank via bores 14 in the gear 9 and a bore 15 in the main housing portion 6. The coolant may likewise be Diesel oil. This has the advantage that, in the event of a leak, the oil flows into the combustion chamber and is burned without interferring with the operation of the engine. At the same time, the coolant serves as a lubricant for the bearings 5', 5" of the shaft 5, each of which communicates via a radial bore in the shaft 5 for this purpose.

Referring to FIG. 1, the housing is also provided with a duct 19 which initially extends upwardly from a mouth at the combustion chamber coaxially of the shaft 5 and then extends at an angle to the shaft 5. The cross section of the duct 19 may be essentially constant or gradually expand in the flow direction of the powdered coal. The lower end of the duct 19 terminates in an annular shoulder 18 of the insert 3 which projects into a corresponding annular groove of the ejector body 4. In the closed position of the ejector body 4 shown in FIG. 1, the outer circumferential surface of the annular shoulder 18 forms a seal with the countersurface 18' of the body 4 adjacent to this shoulder to prevent a powdered coal column contained in the duct 19 from running out. The discharge openings 4' extend from the countersurface 18' radially outwardly at a downwardly inclined angle.

Figure 2:
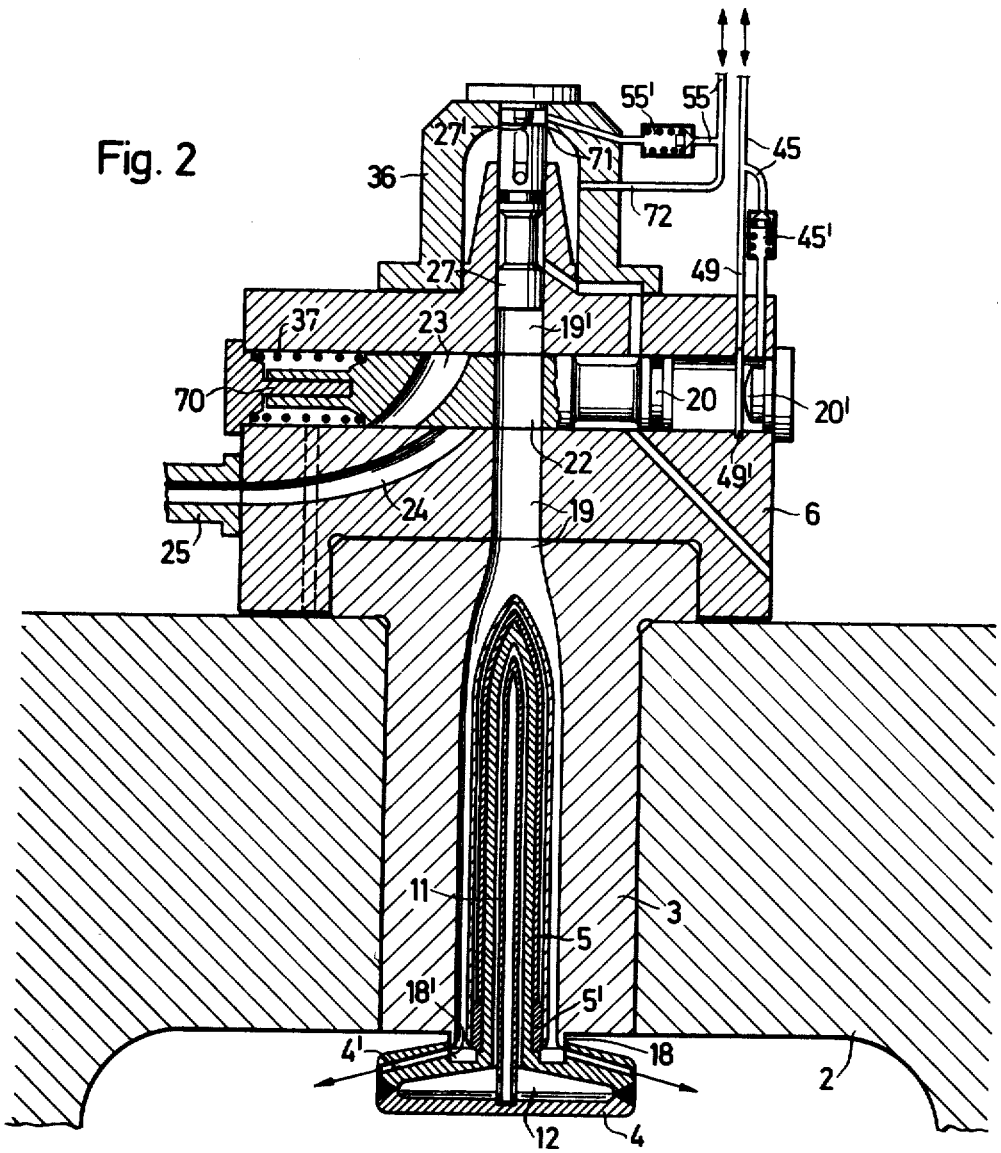
FIG. 2 illustrates a view taken on line II—II of FIG. 1.

A control slider 20 is disposed in the main housing portion 6 transversely of the duct 19 to separate a section 19' of the duct 19 from the remainder of the duct 19. The slider 20 is movable in an axial direction and, in the position shown in FIG. 2, has a passage 22 aligned with the duct 19. In addition, the control slider 20 has a curved passage 23 which, in the position shown in FIG. 3, connects the section 19' of the duct 19, located above the control slider 20, to a further duct 24 which is formed in the main housing portion 6. As shown in FIG. 2, the slider 20 is located at the end of this latter duct 24.

Figure 5:
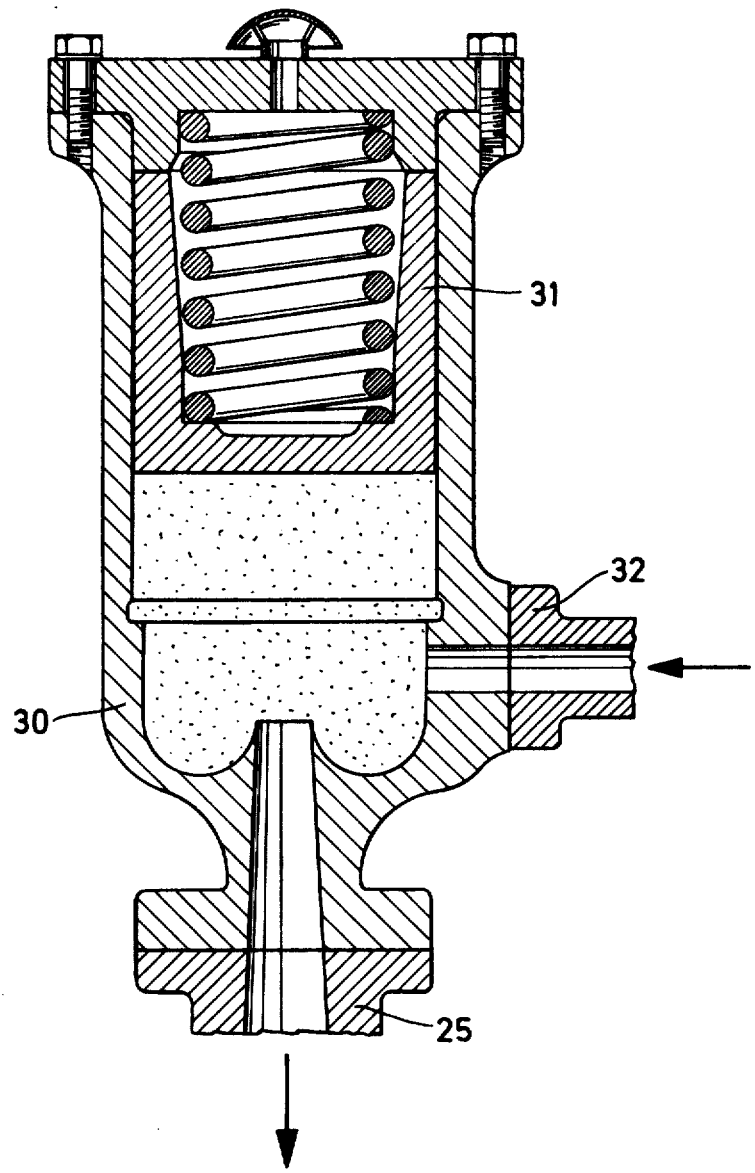
FIG. 5 illustrates a view of a powdered-coal storage chamber for the engine according to the invention.

The duct 24 is part of a means for feeding powdered solid fuel to the cylinder 1, which means also includes a pressurized storage chamber 30 (FIG. 5) for the fuel. The duct 24 is connected to this storage chamber 30 via a suitable line 25. As shown in FIG. 5, the storage chamber 30 has an outlet connected to the line 25 for expelling a flow of fuel. In order to facilitate the flow of the powdered coal in the direction of the duct section 19', the cross sections carrying the powdered coal increase steadily in the flow direction. In order to pressurize the powdered-coal storage chamber 30, a springloaded piston 31 is arranged to feed the coal powder in the chamber 30 to the duct 19 via the line 25, the duct 24 and the control slider 20 in the rhythm of the working piston 10. On the input side, the storage chamber 30 is connected via a line 32 and a conveyor screw (not shown) to a powdered-coal supply tank (not shown) which is common to all cylinders of the internal-combustion engine. When the storage chamber 30 is filled by means of the conveyor screw, the piston 31 is moved upward against the pressure of the spring.

Referring to FIG. 1, a plunger 27 is disposed in the duct section 19' above the slider 20 at the end opposite the ejector body 4 and serves to push the fuel in the duct 19 cyclically to the ejector body 4 for ejection into the combustion chamber. In addition, the main housing portion 6 is provided with a cover 36 in the region of the duct section 19' to define a chamber to which a pressure medium can be admitted. As shown, the cover 36 encloses the upper end of the plunger 27.

Figure 3:
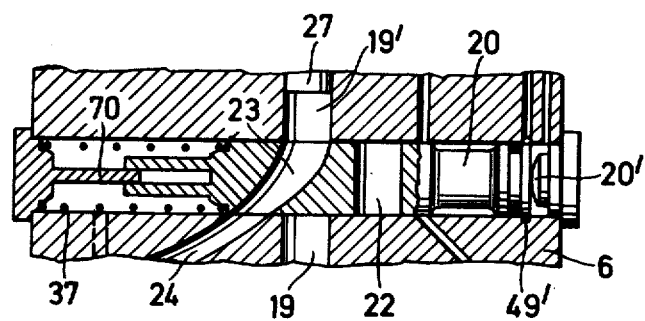
FIG. 3 illustrates a partial cross-sectional view of the control slider according to the invention.
Figure 4:
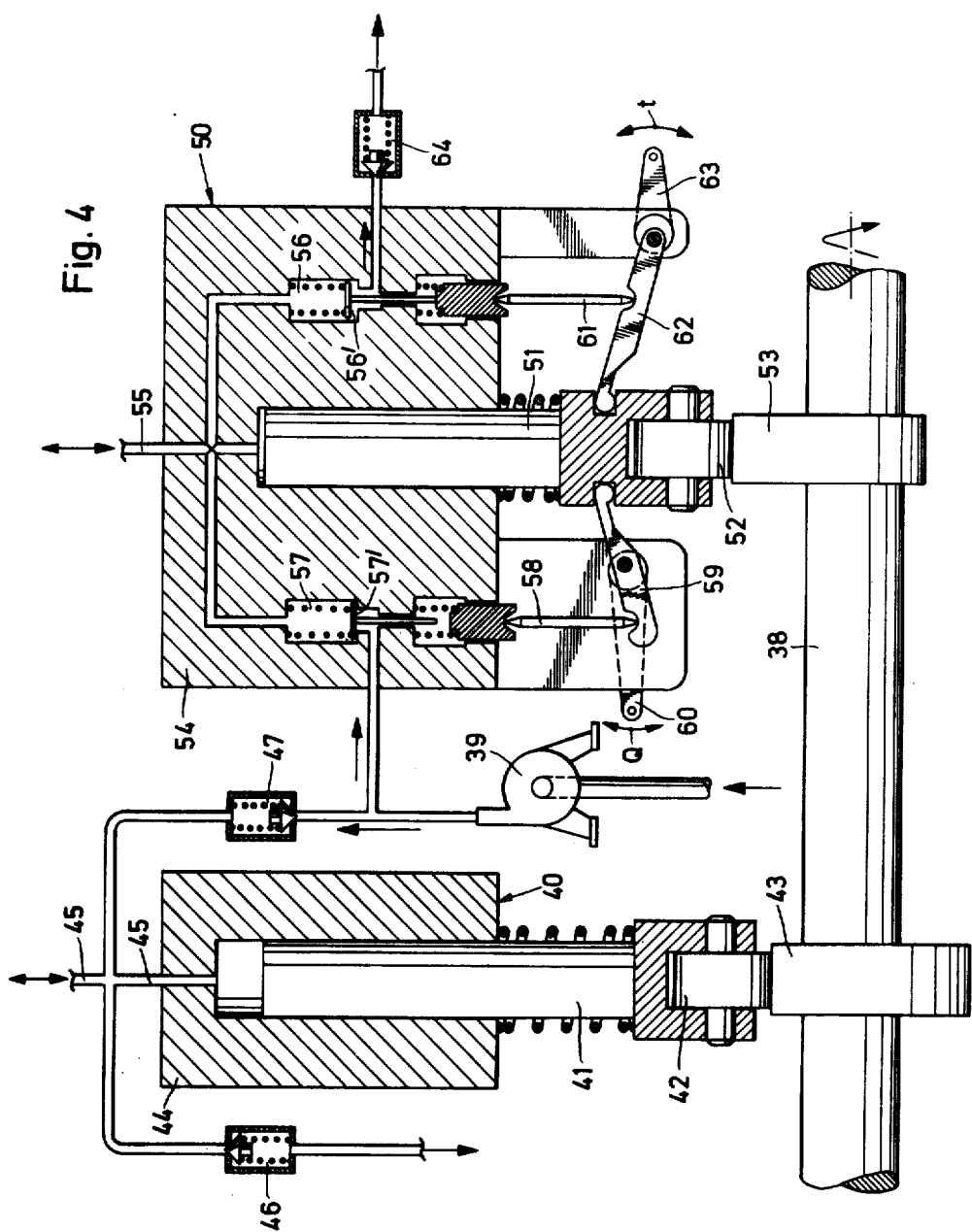
FIG. 4 illustrates a view of a pump for operating the slider and a fuel dosing pump.

Referring to FIG. 4, in order to operate the control slider 20 and the plunger 27, a slider pump 40 and a fuel dosing pump 50 are provided. The slider pump 40 has a piston 41 which is biased at the lower end, via a roller 42, against a cam 43 of a cam shaft 38. A cylinder 44 of the slider pump 40 is connected with a line 45 which communicates via a check valve 45' to the main housing portion 6 near a stop 20' for the end of the control slider 20, shown to the right in FIG. 2. Another line 49 branches off from the line 45 ahead of a check valve 45' and opens into an annular slot 49' which is arranged in the bore for the slider 20 to the left of the stop 20' as viewed in FIG. 2. In this manner, the motion of the control slider 20 is damped shortly before reaching the stop 20' because the pressure medium can only flow out into the line 49 in a throttled manner after the end face of the control slider 20 has passed the annular slot 49'. The left end of the control slider 20 is provided with an axial slot into which a cross piece 70 fastened at the main housing portion 6 protrudes to secure the control slider 20 against rotation. The slotted end of the control slider 20 is furthermore biased by a compression spring 37, which moves the control slider 20 into the position shown in FIG. 3 if the pressure of the pressure medium in the line 45 falls below a given value which is set by an overflow valve 46 (FIG. 4). A feed pump 39 is provided to supply the slider pump 40 with pressure medium and is connected to the line 45 via a check valve 47.

The fuel dosing pump 50 likewise has a piston 51, the lower end of which is biased via a roller 52 against a cam 53 of the cam shaft 38. The cylinder 54 of the fuel dosing pump 50 is connected via a line 55 and a check valve 55' to the chamber bounded by the cover 36 near a stop 27' for the plunger 27. As in the case of the control slider stop 20', a line 72 branches off ahead of the check valve 55' (FIG. 2) through which the pressure medium flows off in a throttled manner if the plunger 27 has passed an edge 71 in the cover 36. In addition, the pressure medium line 55 is connected via a suction valve 57 to the feed pump 39. The suction valve 57 is constructed as a controlled valve. However, a closing part 57' of the suction valve 57 is in operating connection with the piston 51 via a linkage 58 and a two-armed lever 59. Thus, the closing part 57' of the suction valve 57 is opened in dependence on the movement of the piston 51 and thereby the drawn-in volume is influenced by the motion of the piston 51. An adjustment lever 60 is coupled to the two-armed lever 59, so that the closing point, and thus the operation, of the suction valve 57 can be adjusted.

The pressure medium line 55 is also connected with a controlled overflow valve 56, the closing member 56' of which is in operating connection with the piston 51 via a linkage 61 and a one-armed lever 62. By means of this lever 62, the instant of the flow of pressure medium from the line 55 is influenced in dependence on the movement of the piston 51. An adjustment lever 63 is also connected to the one-armed lever 62 so that the instant of opening, and thus the operation, of the overflow valve 56 can be varied. A pressurized valve, i.e. check valve, 64 is connected downstream from the overflow valve 56 so that the pressure medium can flow off, after the overflow valve 56 is opened, only when the counterpressure set at the check valve 64 is reached.

Referring to FIGS. 6a to 6d, the engine operates as follows:

At the lower dead center UTP of the working piston 10, the plunger 27 is in the raised position and the piston 51 of the dosing pump 50 as well as the piston 41 of the slider pump 40 are in the lower position while the control slider 20 occupies the filling position shown in FIG. 3. The spring-loaded piston 31 of the storage chamber 30 displaces a part of the powdered coal contained in the storage chamber 30 via the line 25, the duct 24 and the passage 23 of the control slider 20 into the duct section 19', pushing the plunger 27 up to the stop 27'. After a certain rotation of the crankshaft (not shown) the slider pump 40 begins operation at the time SPS. At this time, the flushing slots (not shown) in the cylinder 1 are closing. The pump 40 then exerts pressure on the control slider 20 via the line 45, so that the slider 20 is moved against the pressure of the spring 37 into the position shown in FIG. 2 (working position FIG. 6c) in which the duct 19 is aligned with the passage 22 in the control slider 20. This displacement motion is completed at the time AS, i.e. at the end of the flushing phase in the cylinder 1, whereupon the overflow valve 46 of the slider pump opens. The pressure on the control slider 20 thus becomes constant (FIG. 6d). At the time EB, before the working piston 10 reaches the upper dead center OTP, the transporting of powdered coal from the duct 19 into the combustion space of the cylinder begins (with 4/4 load). Inasmuch as the piston 51 of the dosing pump 50 exerts a pressure on the plunger 27 via the line 55, the plunger and thereby the powdered-coal column in the duct section 19', the passage 22 and the remainder of the duct 19 is moved downward (FIGS. 6a and b). The continuously rotating ejector body 4 is simultaneously moved axially downward far enough that the sealing surfaces 18 and 18' become disengaged and powdered coal is thrown from the duct 19 via the apertures 4' of the body 4 into the combustion chamber. At the time EE, which is shortly after the upper dead center OTP (but could also be shortly ahead), feeding of the powdered coal is terminated, as the overflow valve 56 of the dosing pump 50 opens (FIG. 6b). Due to the pressure which becomes effective in the cylinder 1 due to the combustion of the powdered coal, the plunger 27 is moved upward a small distance together with the powdered coal column in the duct 19 (FIG. 6a) and the check valve 64 responds. The upward motion is completed when the body 4 again occupies the upper position shown in FIG. 1. At the time SPO, i.e. at the start of the flushing phase in the cylinder 1, the piston 41 of the slider pump 40 moves down again until the pressure in the cylinder 44 drops below the pressure set at the valve 47 and fresh pressure medium is supplied from the feed pump 39 (FIG. 6d). Due to the overflow at the valve 46 and the renewed intake via the valve 47, as described above, part of the pressure medium acting in the slider pump 40 is renewed with each cycle.

With the dropping of the pressure of the slider pump 40, the pressure in the line 45 drops. Thus, the control slider 20 is again moved into the filling position shown in FIG. 3 under the influence of the compression spring 37 (FIG. 6c). During the subsequent filling, the plunger 27 returns to the uppermost position at the stop 27' while the pressure of the dosing pump 50 drops to the value given by the feed pump 39 shortly before the lower dead center UTP of the working piston 10 is reached (FIGS. 6a and b).

For partial load of the engine, the motion cycles are in principle the same. As the dashed lines in FIGS. 6a and b show, the time EB is shifted for ¼ load toward the upper dead center OTP of the working piston 10, and the effective stroke of the fuel dosing pump 50 and thus, the stroke of the plunger 27 are correspondingly smaller.

As the coolant for the ejector body 4 and the pressure medium driving the hydraulic motor for the ejector body 4, the pressure medium which moves the control slider 20 and the plunger 27, advantageously consists of Diesel oil.

The means for igniting the powdered coal blown into the combustion space are not shown and are of the conventional kind, for instance, an incandescent plug, a small amount of injected oil or the like.

The ejector body 4 may also be provided with blades on the upper side facing the duct 19 instead of the apertures 4' in order to throw the powdered fuel into the combustion chamber.

What is claimed is:

1. In an internal combustion engine having at least one cylinder defining a combustion chamber and having a reciprocating piston slidably mounted therein, the combination comprising
   means for feeding a powdered solid fuel to said cylinder, said means including a pressurized storage chamber for the fuel and a first duct connected to said storage chamber;
   a control slider disposed at an end of said first duct spaced from said storage chamber for opening and closing said first duct;
   a second duct disposed in selective communication with said first duct to receive fuel therefrom and extending to said combustion chamber;
   a rotatable ejection means disposed in said combustion chamber at an end of said second duct; and
   a plunger in said second duct at an end opposite said ejection means for pushing the fuel cyclically to said ejection means for ejection into said combustion chamber.

2. The combination as set forth in claim 1 which further comprises means for moving said ejection means axially of said second duct from a first position closing said second duct to a second position opening said second duct to said combustion chamber.

3. The combination as set forth in claim 1 wherein said first duct is of increasing flow cross-section in the direction away from said storage chamber.

4. The combination as set forth in claim 1 wherein said second duct has a section on an opposite side of said slider from said combustion chamber and receiving said plunger therein, said slider being movable between a filling position communicating said first duct with said section while blocking said section from the remainder of said second duct and a working position communicating said section with said remainder of said second duct while blocking said first duct from said section.

5. The combination as set forth in claim 1 wherein said ejection means and an outlet of said second duct are coaxial of said cylinder.

6. The combination as set forth in claim 1 which further comprises a pump and a line connecting said pump to one end of said slider for delivering a pressure medium to said slider end to move said slider from said filling position to said working position.

7. The combination as set forth in claim 6 which further comprises a spring at an opposite end of said slider biasing said slider from said working position to said filling position.

8. The combination as set forth in claim 1 wherein said ejection means includes a hollow body having discharge openings for the fuel and an elongated shaft connected to said body and passing through said second duct, and which further includes a cooling means for passing coolant through said shaft and said body, said cooling means including a coolant feed duct and a coolant discharge duct in said shaft.

9. The combination as set forth in claim 8 wherein the coolant is a liquid fuel.

10. The combination as set forth in claim 8 which further comprises a hydraulic motor for rotating said shaft.

11. The combination as set forth in claim 8 which further comprises a plurality of bearings rotatably mounting said shaft therein and at least one bore radially in said shaft communicating said coolant feed duct with a respective bearing.

12. The combination as set forth in claim 1 which further comprises a dosing pump and a line connecting said dosing pump to one end of said plunger for delivering a pressure medium to said plunger end to move said plunger towards said combustion chamber.

13. The combination as set forth in claim 12 which further comprises a pump and a line connecting said pump to one end of said slider for delivering a pressure medium to said slider end to move said slider from said filling position to said working position and wherein said pressure medium is Diesel oil.

14. The combination as set forth in claim 12 which further comprises a pump and a line connecting said pump to one end of said slider for delivering a pressure medium to said slider end to move said slider from said filling position to said working position; a rotatable shaft synchronized to the speed of the engine; and a pair of cams on said shaft, each respective cam being drivingly connected to a respective one of said pumps.

15. The combination as set forth in claim 14 wherein said dosing pump includes a cylinder and a piston slidably mounted in said cylinder, and which further comprises a suction valve connected to said cylinder, a first control linkage connecting said piston to said suction valve to operate said suction valve, said linkage including an adjustment lever for adjusting the operation of said suction valve, an overflow valve connected to said cylinder, and a second control linkage connecting said piston to said overflow valve to operate said overflow valve, said second linkage including an adjustment lever for adjusting the operation of said overflow valve.

16. The combination as set forth in claim 15 which further comprises a check valve downstream of and connected to said overflow valve for pressurizing said overflow valve.

17. An internal combustion engine comprising
a cylinder head;
at least one cylinder in said head defining a combustion chamber;
a piston slidably mounted in said cylinder;
a housing mounted on said cylinder head coaxially of said cylinder;
a first duct in said housing for receiving a supply of powdered fuel;
a second duct in said housing communicating with said first duct and extending to said combustion chamber;
a control slider in said housing disposed transversely of said second duct to separate a section of said second duct spaced from said combustion chamber from the remainder of said second duct, said slider being movable between a filling position communicating said first duct with said section while blocking said section from the remainder of said second duct and a working position communicating said section with said remainder of said second duct while blocking said first duct from said section;
a plunger in said section of said second duct for pushing fuel cyclically towards said combustion chamber;
a rotatable ejection means disposed in said combustion chamber at an end of said second duct;
means for moving said ejection means axially of said second duct from a first position closing said second duct to a second position opening said second duct to said combustion chamber; and
means for rotating said ejection means in said second position thereof.

* * * * *